United States Patent
Higgins

(10) Patent No.: US 9,225,777 B2
(45) Date of Patent: *Dec. 29, 2015

(54) LOAD BALANCER

(71) Applicant: Amazon Technologies, Inc., Reno, NV (US)

(72) Inventor: Chris Higgins, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/627,834

(22) Filed: Feb. 20, 2015

(65) Prior Publication Data

US 2015/0163299 A1    Jun. 11, 2015

Related U.S. Application Data

(63) Continuation of application No. 13/112,682, filed on May 20, 2011, now Pat. No. 8,998,544.

(51) Int. Cl.
*G06F 15/16* (2006.01)
*H04L 29/08* (2006.01)
*H04L 29/06* (2006.01)

(52) U.S. Cl.
CPC ........ *H04L 67/1029* (2013.01); *H04L 29/0602* (2013.01); *H04L 67/1004* (2013.01)

(58) Field of Classification Search
CPC .................................................. H04L 29/0602
USPC ........................................................ 709/203
See application file for complete search history.

(56) References Cited

U.S. PATENT DOCUMENTS

| | | | |
|---|---|---|---|
| 6,601,084 B1 | 7/2003 | Bhaskaran et al. | |
| 6,728,961 B1 | 4/2004 | Velasco | |
| 7,389,510 B2 | 6/2008 | Forrester | |
| 7,475,157 B1 | 1/2009 | Tormasov | |
| 7,809,831 B2 | 10/2010 | Matsumitsu et al. | |
| 8,010,679 B2 | 8/2011 | Low et al. | |
| 8,279,782 B2 | 10/2012 | Abdel-Ghaffar et al. | |
| 8,429,096 B1 * | 4/2013 | Soundararajan et al. | 706/12 |
| 8,516,493 B2 | 8/2013 | Hande et al. | |
| 8,694,400 B1 * | 4/2014 | Certain et al. | 705/35 |
| 2002/0022952 A1 | 2/2002 | Zager et al. | |
| 2003/0037113 A1 | 2/2003 | Petrovykh | |
| 2003/0154112 A1 * | 8/2003 | Neiman et al. | 705/5 |
| 2004/0088413 A1 | 5/2004 | Bhogi et al. | |
| 2004/0125768 A1 | 7/2004 | Yoon et al. | |

(Continued)

OTHER PUBLICATIONS

Election Restriction for U.S. Appl. No. 13/112,682, filed May 20, 2011, to Chris Higgins, 6 pages, Dec. 7, 2012.

(Continued)

*Primary Examiner* — Asad Nawaz
*Assistant Examiner* — Syed S Ali
(74) *Attorney, Agent, or Firm* — Baker Botts L.L.P.

(57) ABSTRACT

According to one embodiment, an apparatus comprises an interface and one or more processors. The interface receives a request for a web page from a web browser. The one or more processors select a subset of web servers from a resource pool according to a load balancing determination. The one or more processors send the request to at least two of the web servers of the subset before receiving any response from the other web servers. Upon receiving one or more responses from distinct web servers, the one or more processors selects a response to communicate to the web browser.

16 Claims, 2 Drawing Sheets

(56) References Cited

U.S. PATENT DOCUMENTS

| | | |
|---|---|---|
| 2005/0257220 A1 | 11/2005 | McKee |
| 2006/0206931 A1 | 9/2006 | Dillaway et al. |
| 2008/0091775 A1* | 4/2008 | Wang et al. ............. 709/203 |
| 2010/0169490 A1 | 7/2010 | McNair |
| 2011/0072139 A1 | 3/2011 | Denker et al. |
| 2011/0078318 A1 | 3/2011 | Desai et al. |
| 2011/0213886 A1 | 9/2011 | Kelkar et al. |
| 2011/0282995 A1* | 11/2011 | Gass et al. ............. 709/226 |
| 2012/0036180 A1* | 2/2012 | Thornton et al. ......... 709/203 |
| 2012/0060167 A1 | 3/2012 | Salsburg et al. |
| 2012/0084443 A1* | 4/2012 | Theimer et al. ........... 709/226 |
| 2012/0117241 A1 | 5/2012 | Witt et al. |
| 2012/0117571 A1 | 5/2012 | Davis et al. |
| 2012/0136728 A1 | 5/2012 | Hsiung et al. |
| 2012/0151358 A1 | 6/2012 | Joanny et al. |
| 2012/0254433 A1 | 10/2012 | Gujral et al. |
| 2012/0294308 A1 | 11/2012 | Cai et al. |
| 2013/0054808 A1 | 2/2013 | Hildebrand et al. |
| 2014/0032477 A1 | 1/2014 | Trammel et al. |

OTHER PUBLICATIONS

Response to Election Restriction for U.S. Appl. No. 13/112,682, filed May 20, 2011, to Chris Higgins, 4 pages, Jan. 7, 2013.
Non-Final Office Action for U.S. Appl. No. 13/112,682, filed May 20, 2011, to Chris Higgins, 16 pages, Apr. 12, 2013.
Response to Non-Final Office Action for U.S. Appl. No. 13/112,682, filed May 20, 2011, to Chris Higgins, 12 pages, Jul. 1, 2013.
Non-Final Office Action for U.S. Appl. No. 13/112,682, filed May 20, 2011, to Chris Higgins, 21 pages, Oct. 25, 2013.
Response to Non-Final Office Action for U.S. Appl. No. 13/112,682, filed May 20, 2011, to Chris Higgins, 11 pages, Feb. 19, 2014.
Final Office Action for U.S. Appl. No. 13/112,682 filed May 20, 2011, to Chris Higgins, 24 pages, Mar. 14, 2014.
Amendment Filed with RCE for U.S. Appl. No. 13/112,682, filed May 20, 2011 to Christ Higgins, 10 pages, Jun. 4, 2014.
Non-Final Office Action for U.S. Appl. No. 13/112,682, filed May 20, 2011, to Chris Higgins, 27 pages, Aug. 29, 2014.
Response to Non-Final Office Action, U.S. Appl. No. 13/112,682, filed May 20, 2011, to Chris Higgins, 11 pages, Nov. 21, 2014.

* cited by examiner

LOAD BALANCER

RELATED APPLICATION

This application is a continuation of U.S. application Ser. No. 13/112,682 filed May 20, 2011 and entitled "Load Balancer," the entire disclosure of which is hereby incorporated by reference.

BACKGROUND

A load balancer may allocate workload to members of a pool of resources. As an example, a load balancer may allocate a request for a web page to a web server selected from a pool of web servers. To balance the workload, the load balancer may select one web server to provide a response to a first request and another web server to provide a response to a second request. By allocating the different requests to different web servers, the load balancer may reduce the likelihood that one of the web servers becomes over-burdened.

DETAILED DESCRIPTION

A load balancer may allocate workload to members of a pool of resources. As an example, a load balancer may allocate a request for a web page to a web server selected from a pool of web servers. To balance the workload, the load balancer may select one web server to provide a response to a first request and another web server to provide a response to a second request. By allocating the different requests to different web servers, the load balancer may reduce the likelihood that one of the web servers becomes over-burdened. It may be better to have more efficient load balancing in order to provide a faster response to the request and/or to determine the likelihood that the response is valid.

Certain embodiments of the invention may provide for efficient and/or effective load balancing. In certain embodiments, a load balancer sends the same request to multiple resources. The load balancer may select a response to the request according to the resource that responds the fastest, according to a confidence level associated with the response, or according to other suitable criteria. In certain embodiments, the confidence level may be determined by comparing a candidate response to one or more other responses received from different resources in response to the same request.

Figure 1:
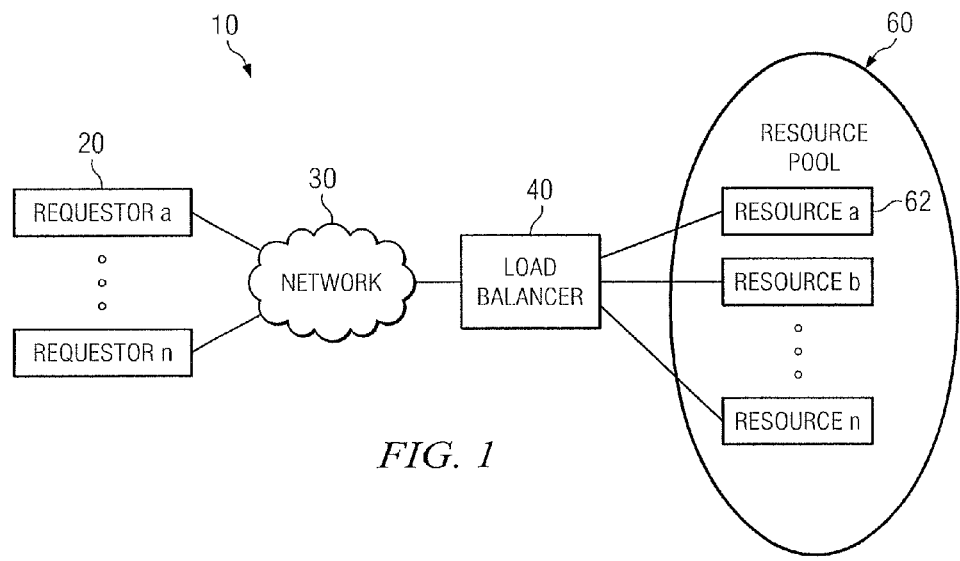
FIG. 1 illustrates an example of a system that may be used to provide load balancing.

FIG. 1 illustrates an example of a system 10 that may be used to provide load balancing. In the illustrated example, system 10 includes a requestor 20, a network 30, a load balancer 40, and a resource pool 60 comprising a plurality of resources 62a through 62n.

In certain embodiments, load balancer 40 receives a request from requestor 20 via network 30. Load balancer 40 may select a subset of resources 62 from resource pool 60 to respond to the request. Each resource 62a through 62n may be operable to provide a response to the request. For purposes of illustration, load balancer 40 may select a subset including resources 62a, 62b, and 62c and excluding resources 62d through 62n. Load balancer 40 may send the request to the subset of resources 62a, 62b, and 62c. The request may be sent to at least two of resources (e.g., resources 62a and 62b) before receiving a response from any of the resources of the subset (e.g., resources 62a, 62b, or 62c). Load balancer 40 may receive one or more responses to the request. Each response may be received from a distinct resource 62. For example, load balancer 40 may receive a first response from resource 62a, a second response from resource 62b, and a third response from resource 62c. Load balancer 40 may select either the first response, the second response, or the third response and may send the selected response to requestor 20.

Requestor 20 may refer to any device that provides requests to which resources 62 may respond. In certain embodiments, requestor 20 may include a computer, workstation, telephone, Internet browser, electronic notebook, Personal Digital Assistant (PDA), pager, or any other suitable device (wireless, wireline, or otherwise), component, or element capable of receiving, processing, storing, and/or communicating information with other components of system 10. Requestor 20 may also comprise any suitable user interface such as a display, microphone, keyboard, or any other appropriate interface. In certain embodiments, requestor 20 may be configured as a client that accesses computing resources via network 30.

Requestor 20 may request resource 62 to provide data and/or to perform an operation. As an example, requestor 20 may comprise a web browser operable to request a web page, and resource 62 may comprise a web server operable to provide the web page to requestor 20. As another example, requestor 20 may request a web service, and resource 62 may comprise a service provider operable to provide a component or perform a function of the web service. As yet another example, requestor 20 may request a DNS lookup for a domain name, and resource 62 may comprise a DNS server operable to provide an identifier, such as an IP address, corresponding to the domain name.

In certain embodiments, network 30 may refer to any interconnecting system capable of transmitting audio, video, signals, data, messages, or any combination of the preceding. Network 30 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

Resource pool 60 may refer to any suitable grouping of resources 62. As an example, resources 62 may be grouped according to functionality based on the types of requests resources 62 have been configured to process. For example, one resource pool 60 may comprise web servers operable to provide web content, and another resource pool may comprise DNS servers operable to provide address resolution. As another example, resources 62 may be grouped according to the type of requestor 20 resources 62 have been configured to interact with. For example, one resource pool 60 may handle requests associated with external customers of an enterprise and another resource pool may handle requests associated with internal processes of the enterprise. As another example, resources 62 may be grouped according to physical location. A resource pool 60 may include resources located proximate to one another (e.g., resources located in a same datacenter)

and/or resources dispersed from one another (e.g., resources located in different datacenters).

Resources 62 comprise any resource operable to respond to requests from requestors 20. In some embodiments, a resource 62 may refer to any suitable combination of hardware and/or software implemented in one or more modules to process data and provide the described functions and operations. In some embodiments, resource 62 may include, for example, a mainframe, server, host computer, workstation, web server, file server, a personal computer such as a laptop, or any other suitable device operable to process data. In some embodiments, resource 62 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems.

Figure 2:
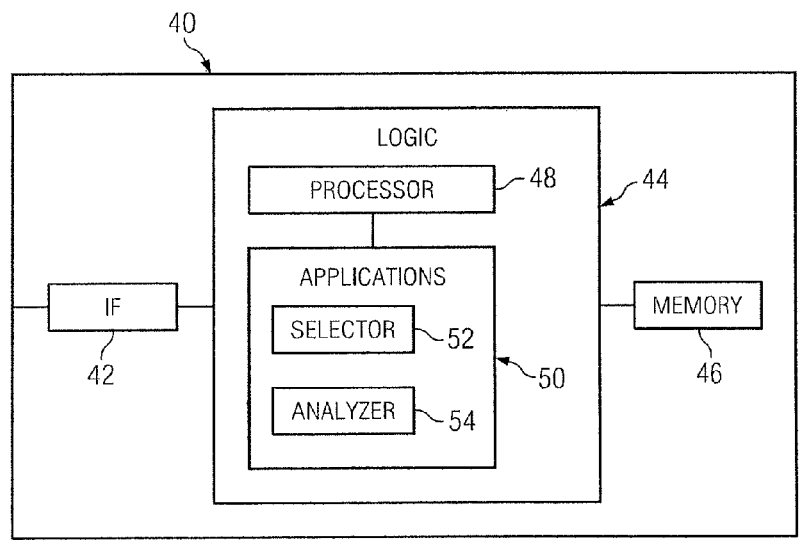
FIG. 2 illustrates an example of a load balancer that may be used in the system described in FIG. 1.

FIG. 2 illustrates an example of load balancer 40 that may be used in system 10 described in FIG. 1. In certain embodiments, load balancer 40 may select a subset of resources 62 to forward a request to, receive one or more responses to the request, and select one of the responses to forward to requestor 20.

In certain embodiments, load balancer 40 may include an interface 42, logic 44, memory 46, and/or other suitable element. Interface 42 receives input, sends output, processes the input and/or output, and/or performs other suitable operation. In certain embodiments, interface 42 receives a request from requestor 20 and sends the request to a subset of resources 62. In certain embodiments, interface 42 receives a plurality of responses from resources 62 and sends one of the responses to requestor 20. Interface 42 may comprise hardware and/or software.

Logic 44 performs the operations of the component, for example, logic 44 executes instructions to generate output from input. Logic 44 may include hardware (such as one or more processors 48), software (such as applications 50), and/or other logic. Logic 44 may be encoded in one or more tangible media and may perform operations when executed by a computer. Certain logic 44, such as a processor 48, may manage the method of performing of a component. Examples of a processor 48 include one or more computers, one or more microprocessors, one or more hardware or software applications, and/or other logic.

Applications 50 generally refer to logic, rules, algorithms, code, tables, and/or other suitable instructions for performing the described functions and operations. Examples of applications 50 include a selector 52 and an analyzer 54. Selector 52 selects the subset of resources 62 to send the request to. In certain embodiments, selector 52 may select the number of resources 62 to send the request to and may identify the particular resources 62 to include in the subset. The particular resources 62 may be selected according to a load balancing determination. The load balancing determination may use any suitable load balancing algorithm or combination of algorithms, such as round robin, variable hash, least used resource, and so on. In certain embodiments, the load balancing determination may evaluate health information associated with resources 62. For example, selector 52 may exclude a particular resource 62 from the subset if the health information indicates that resource 62 is overloaded, down, or generating errors.

Analyzer 54 analyzes a plurality of responses received from resources 62 and determines one of the responses to send to requestor 20. In certain embodiments, analyzer 54 may select the response according to a priority characteristic. Examples of priority characteristics include speed and validity. If the priority characteristic corresponds to speed, analyzer 54 may select the first response (i.e., the response received prior to receiving any other response) to send to requestor 20. If the priority characteristic corresponds to validity, load balancer 40 may select the response according to a validity check. As an example, analyzer 54 may select the response if a confidence level associated with the response is greater than a minimum confidence level as further described with respect to FIGS. 3-4 below. In certain embodiments, the priority characteristic may be determined based on the request. For example, the priority characteristic for certain types of requests may correspond to speed, and the priority characteristic for other types of requests may correspond to validity.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 46 stores information. Memory 46 may comprise one or more tangible, computer-readable, and/or computer-executable storage medium, and may exclude signals or carrier waves. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Figure 3:
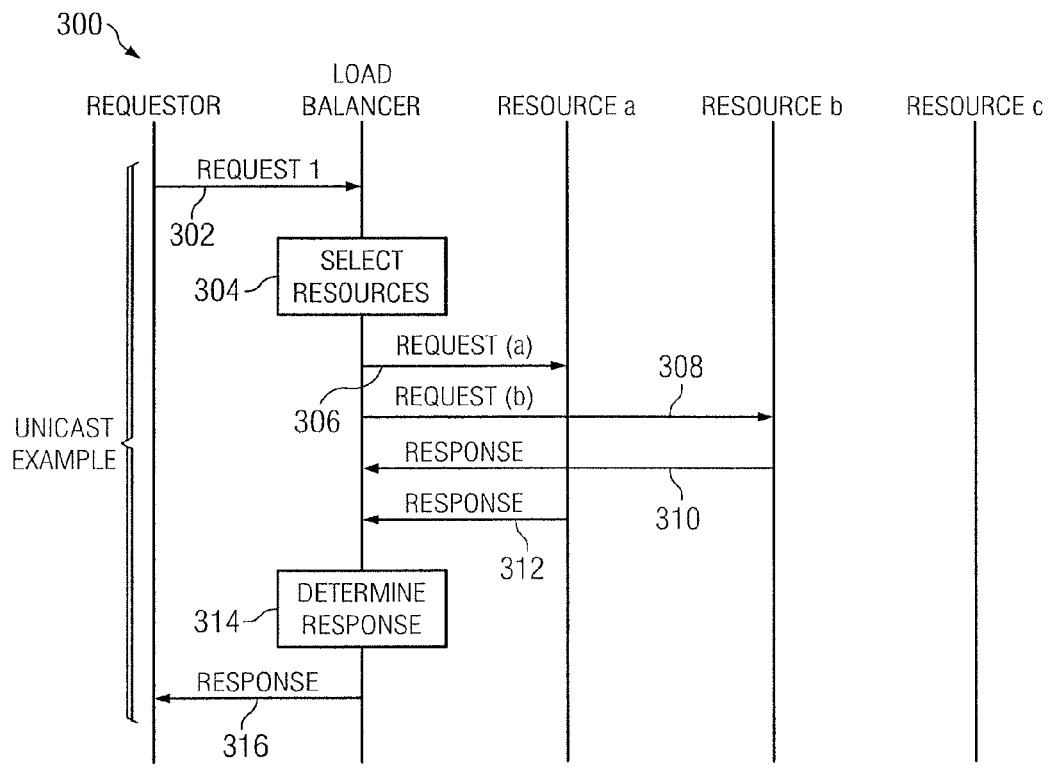
FIG. 3 illustrates an example of a method for load balancing using unicast messaging.

FIG. 3 illustrates an example of a method 300 for load balancing using unicast messaging. At step 302, load balancer 40 receives a request from requestor 20. The request may request the use of a resource 62 to provide data and/or to perform an operation.

Load balancer 40 selects a subset of resources 62 from resource pool 60 at step 304. Each resource 62 may be operable to provide a response to the request. For example, if requestor 20 requests a web page, resource pool 60 may comprise a plurality of web servers operable to provide the requested web page. As another example, if requestor 20 requests a web service, resource pool 60 may comprise a plurality of service providers operable to provide a component or perform a function of the web service to facilitate providing the web service to requestor 20. As yet another example, if requestor 20 requests a domain name look-up, resource pool 60 may comprise a plurality of DNS servers operable to provide an identifier, such as an IP address, corresponding to the domain name.

Load balancer 40 may select any suitable number of resources 62 to include in the subset of resources, such as less than 5 resources, 5 to 10 resources, 10 to 100 resources, greater than 100 resources, or any other number of resources. In certain embodiments, load balancer 40 analyzes a plurality of factors to determine the number of resources to include in the subset. As an example, one of the factors may evaluate the total number of resources in the resource pool. Load balancer 40 may include more resources in the subset if resource pool 60 is relatively large and may include fewer resources in the subset if resource pool 60 is relatively small. As another example, one of the factors may evaluate the current utilization rate of the resources. That is, the number of resources 62 in the subset may be adjusted according to whether the system is experiencing a busy period or an idle period. As yet another example, one of the factors may evaluate the priority of the request. Load balancer 40 may include more resources in the subset if the request is high priority and fewer resources in the subset if the request is low priority.

Load balancer 40 may select the particular resources 62 to include in the subset according to a load balancing determination. The load balancing determination may use any suitable algorithm or combination of algorithms, such as round robin, variable hash, least used resource, and so on. In certain embodiments, the load balancing determination may evaluate health information associated with resources 62. For example, load balancer 40 may exclude a particular resource 62 from the subset if the health information indicates that resource 62 is overloaded, down, or generating errors. In the example illustrated in FIG. 3, load balancer 40 selects resource 62a and resource 62b to include in the subset.

Load balancer 40 sends the request to the subset of resources 62a and 62b. The request may be sent to at least two resources 62 of the subset before receiving any response from the other resources 62. In other words, load balancer 40 may send the request to a second resource 62b without waiting for a response from the first resource 62a. In certain embodiments, load balancer 40 may send the requests using unicast messaging. For example, load balancer 40 may send a first unicast request (a) to resource 62a in step 306 and a second unicast request (b) to resource 62b in step 308. In certain embodiments, request (a) and request (b) may request the resources to provide the same data or to perform the same operation. As an example, request (a) may request resource 62a to provide web page X and request (b) may request resource 62b to provide the same web page (i.e., web page X).

Load balancer 40 may receive one or more responses to the requests. Each response may be received from a distinct resource 62. For example, resource 62b may respond to the request in step 310 and resource 62a may respond to the request in step 312. The response may comprise requested data and/or the result of a requested operation. As an example, the response in step 310 may include web page X and the response in step 312 may also include web page X.

In certain embodiments, a particular resource 62 may choose not to reply to the request. For example, a service level agreement (SLA) may indicate whether or not a particular resource 62 should provide a response based on any suitable criteria, such as the current load of the particular resource 62. In certain embodiments, the request message may indicate whether or not the particular resource 62 may opt out of providing a response in order to ensure that at least one of the resources 62 processes the request. Alternatively, load balancer 40 may resend the request to the same resources 62 or different resources 62 if it fails to receive a response within a pre-determined time period.

At step 314, load balancer 40 determines a response to send to requestor 20. In certain embodiments, load balancer 40 may select the response according to a priority characteristic. Examples of priority characteristics include speed and validity. If the priority characteristic corresponds to speed, load balancer 40 may select the first response (i.e., the response received prior to receiving any other response) to send to requestor 20. In the example illustrated in FIG. 3, the first response corresponds to the response received from resource 62b in step 310. In certain embodiments, load balancer 40 may minimize delay by selecting the first response and/or communicating the first response to requestor 20 without waiting to receive responses from any other resources.

If the priority characteristic corresponds to validity, load balancer 40 may select the response according to one or more validity checks. An example of a validity check may include reviewing the response for an error code. If load balancer 40 detects the presence of an error code, load balancer 40 may determine not to select that response. In certain embodiments, a protocol that the response is based on may define error codes, such as 4xx and 5xx status codes of the HTTP protocol. Another example of a validity check includes comparing a candidate response to one or more of the other responses. If the candidate response matches a pre-determined number of other responses, load balancer 40 may set the candidate response as the selected response.

As an example, suppose load balancer 40 sent a request for web page X to five resources 62, and that the pre-determined number of responses is set to two. Suppose load balancer 40 receives a first response including web page Y, a second response including web page X, a third response including web page X, and a fourth response including web page X. Suppose the fifth resource 62 fails to provide any response. Load balancer 40 evaluates the first response as the candidate response and determines that web page Y does not match any of the other responses. Thus, load balancer 40 does not select the first response. Load balancer 40 then evaluates the second response as the candidate response. The second response matches two other responses (web page X of the third response and web page X of the fourth response). That is, the second response matches the pre-determined number of other responses, and load balancer 40 determines the second response is likely valid. Accordingly, load balancer 40 sets the second response as the selected response and communicates the second response to requestor 20. In the example, load balancer 40 selected the response once the pre-determined number of responses matched and without having to wait for responses from all of the resources 62 to which load balancer 40 sent the request (e.g., load balancer 40 received no response from the fifth resource 62).

In certain embodiments, load balancer 40 may use the comparison between the candidate response and the other responses to determine a confidence level for the candidate response. In the above example, the confidence level for the first response may be y % because web page Y was included in y % of the responses. The confidence level of the second response may be x % because web page X was included in x % of the responses. In the illustrated example, x % may be equal to (1−y) %. In certain embodiments, load balancer 40 may determine the response to send to requestor 20 according to the confidence level. For example, load balancer 40 may select the response if the confidence level is greater than 50%, 60%, 70%, or other suitable percentage. Load balancer 40 may optionally communicate the confidence level to requestor 20. For example, load balancer 40 may insert the confidence level in a message comprising the selected response. In certain embodiments, the confidence level may be inserted in a header or an extension field of a packet that comprises at least a portion of the selected response.

In certain embodiments, load balancer 40 may generate an indicator indicating that a candidate response comprises an aberration. For example, if the candidate response differs from a pre-determined number of other responses, it may be determined that the candidate response comprises an aberration. In certain embodiments, it may be determined that the candidate response differs from a pre-determined number of other responses based on the confidence level, such as a confidence level less than 50%, 40%, 30%, or other suitable percentage. The indicator provides an identifier identifying the resource 62 that provided the aberrant response. The indicator may indicate that an administrator should check the health of the identified resource 62. Load balancer 40 may optionally wait until the indicator has been cleared before including the identified resource 62 in a subsequent subset of resources 62 selected to process a subsequent request. That is, load balancer 40 may optionally remove the identified resource 62 from resource pool 60 until the indicator has been cleared. In certain embodiments, load balancer 40 may determine whether or not to include the identified resource 62 in resource pool 60 based on the number and/or frequency of aberrant responses associated with the identified resource 62.

In step 316, load balancer 40 communicates the selected response to requestor 20. The method then ends.

Figure 4:
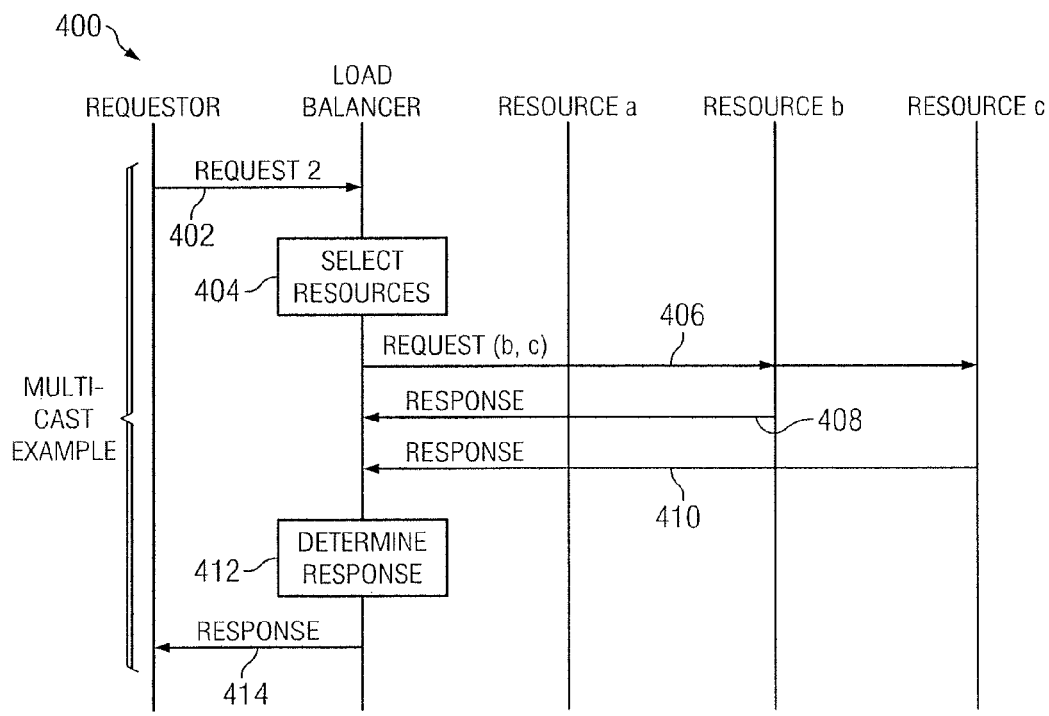
FIG. 4 illustrates an example of a method for load balancing using multicast messaging.

FIG. 4 illustrates an example of a method 400 for load balancing using multicast messaging. At step 402, load balancer 40 receives a request from requestor 20. The request may request the use of a resource 62 to provide data and/or to perform an operation. Load balancer 40 selects a subset of resources 62 from resource pool 60 at step 404. Each resource 62 may be operable to provide a response to the request. Load balancer 40 may select any suitable number of resources 62 to include in the subset of resources. In certain embodiments, the subset of resources 62 may be determined according to a load balancing determination. In the example illustrated in FIG. 4, load balancer 40 selects resource 62b and resource 62c to include in the subset.

Load balancer 40 sends the request to the subset of resources 62b and 62c. The request may be sent to at least two resources 62 of the subset before receiving any response from the other resources 62. In certain embodiments, load balancer 40 may send the requests using multicast messaging. For example, load balancer 40 may send a single multicast request (b,c) simultaneously to resource 62b and resource 62c as illustrated in step 406.

Load balancer 40 may receive one or more responses to request 406. Each response may be received from a distinct resource 62. For example, resource 62b may respond to the request in step 408 and resource 62c may respond to the request in step 410. The response may comprise requested data and/or the result of a requested operation.

At step 412, load balancer 40 determines a response to send to requestor 20. In certain embodiments, load balancer 40 may select the response according to a priority characteristic. Examples of priority characteristics include speed and validity. If the priority characteristic corresponds to speed, load balancer 40 may select the first response (i.e., the response received prior to receiving any other response) to send to requestor 20. In the example illustrated in FIG. 4, the first response corresponds to the response received from resource 62b in step 408. In certain embodiments, load balancer 40 may minimize delay by selecting the first response and/or communicating the first response to requestor 20 without waiting to receive responses from any other resources.

If the priority characteristic corresponds to validity, load balancer 40 may select the response according to a validity check. For example, load balancer 40 may compare a candidate response to one or more of the other responses. If the candidate response matches a pre-determined number of other responses, load balancer 40 may set the candidate response as the selected response. In certain embodiments, the candidate response may be determined to match a pre-determined number of other responses if a confidence level associated with the candidate response is greater than a minimum confidence level. In certain embodiments, the pre-determined number of responses and/or the minimum confidence level may be determined based on the request. For example, the minimum confidence level may be higher for certain types of requests and lower for other types of requests.

In step 414, load balancer 40 communicates the selected response to requestor 20. The method then ends.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. Additionally, the operations of the systems and apparatuses may be performed using any suitable logic comprising software, hardware, and/or other logic. As used in this document, "each" refers to each member of a set or each member of a subset of a set.

Modifications, additions, or omissions may be made to the method without departing from the scope of the invention. The method may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. An apparatus, comprising:
an interface, a memory, and one or more processors;
the interface operative to:
   receive a request from a client; and
the one or more processors comprising hardware, the one or more processors, upon execution of logic in the memory, operative to:
   determine a total number of computing resources to include in a subset of computing resources;
   select the subset of computing resources from a resource pool, each computing resource operable to provide a response to the request, the subset of computing resources selected according to a load balancing determination and the total number of computing resources to include in the subset;
   send the request to each of the computing resources in the subset of computing resources, the request sent to at least two of the computing resources;
   receive one or more responses from the computing resources;
   perform one or more validity checks on the received one or more responses, wherein at least one validity check compares a candidate response with one or more of the other responses;
   determine a confidence level for the candidate response based at least in part on the comparison;
   select a response of the one or more responses; and
   communicate a message comprising the selected response and the confidence level to the client over a communication network.

2. The apparatus of claim 1, the selected response comprising a first response of the one or more responses, the first response received prior to receiving any other response.

3. The apparatus of claim 1, the one or more processors further operative to:
   set the candidate response as the selected response if the candidate response matches a threshold number of other responses.

4. The apparatus of claim 1, wherein the one or more processors are operative to determine the total number of computing resources to include in the subset based at least in part on a current utilization rate of the computing resources.

5. The apparatus of claim 1, wherein the one or more processors are operative to determine the total number of computing resources to include in the subset based at least in part on a priority of the request such that the subset includes more computing resources if the request is high priority and the subset includes fewer computing resources if the request is low priority.

6. Hardware comprising one or more non-transitory computer-readable media, the non-transitory computer-readable media, when executed by one or more processors, is operative to:
receive a request from a client;
determine a total number of computing resources to include in a subset of computing resources;
select the subset of computing resources from a resource pool, the computing resources operable to provide a response to the request, the subset of computing resources selected according to a load balancing determination and the total number of computing resources to include in the subset;
send the request to the computing resources in the subset of computing resources, the request sent to at least two of the computing resources;
receive one or more responses from the computing resources;
perform one or more validity checks on the received one or more responses, wherein at least one validity check compares a candidate response with one or more of the other responses;
determine a confidence level for the candidate response based at least in part on the comparison;
select a response of the one or more responses; and
communicate a message comprising the selected response and the confidence level to the client over a communication network.

7. The computer-readable media of claim 6, the selected response comprising a first response of the one or more responses, the first response received prior to receiving any other response.

8. The computer-readable media of claim 6, the logic further operative to:
set the candidate response as the selected response if the candidate response matches a threshold number of other responses.

9. The computer-readable media of claim 6, wherein the logic is operative to determine the total number of computing resources to include in the subset based on a current utilization rate of the computing resources.

10. The computer-readable media of claim 6, wherein the logic is operative to determine the total number of computing resources to include in the subset based at least in part on a priority of the request such that the subset includes more computing resources if the request is high priority and the subset includes fewer computing resources if the request is low priority.

11. A computer-implemented method, comprising:
receiving a request from a requestor device;
determining a total number of computing resources to include in a subset of computing resources;
selecting the subset of computing resources from a resource pool, the computing resources operable to provide a response to the request, the subset of computing resources selected according to a load balancing determination and the total number of computing resources to include in the subset;
sending the request to the computing resources in the subset of computing resources, the request sent to at least two of the computing resources;
receiving one or more responses from the computing resources;
performing one or more validity checks on the received one or more responses, wherein at least one validity check comprises comparing a candidate response with one or more of the other responses;
determining a confidence level for the candidate response based at least in part on the comparison;
selecting a response of the one or more responses; and
sending a message comprising the selected response and the confidence level to the requestor.

12. The method of claim 11, the selected response comprising a first response of the one or more responses, the first response received prior to receiving any other response.

13. The method of claim 11, wherein the selecting the response further comprises:
determining whether any of the responses include an error code; and
excluding the responses that include the error code.

14. The method of claim 11, wherein the request comprises a request for a web service and the response facilitates providing the web service to the requestor device.

15. The method of claim 11, wherein the total number of computing resources to include in the subset is determined based at least in part on a current utilization rate of the computing resources.

16. The method of claim 11, wherein the total number of computing resources to include in the subset is determined based at least in part on a priority of the request such that the subset includes more computing resources if the request is high priority and the subset includes fewer computing resources if the request is low priority.

* * * * *